(12) United States Patent
 Amir

(10) Patent No.: US 10,966,056 B1
(45) Date of Patent: Mar. 30, 2021

(54) WIRELESS LOCATION SYSTEM

(71) Applicant: CenTrak, Inc., Newtown, PA (US)

(72) Inventor: Israel Amir, Princeton, NJ (US)

(73) Assignee: CenTrak, Inc., Newtown, PA (US)

(*) Notice: Subject to any disclaimer, the term of this patent is extended or adjusted under 35 U.S.C. 154(b) by 0 days.

(21) Appl. No.: 16/775,880

(22) Filed: Jan. 29, 2020

(51) Int. Cl.
| | |
|---|---|
| *H04W 4/029* | (2018.01) |
| *H04W 4/02* | (2018.01) |
| *H04W 64/00* | (2009.01) |
| *H04W 4/80* | (2018.01) |
| *H04W 4/33* | (2018.01) |
| *G01S 5/14* | (2006.01) |
| *G01S 5/02* | (2010.01) |

(52) U.S. Cl.
CPC .......... *H04W 4/029* (2018.02); *G01S 5/0252* (2013.01); *G01S 5/14* (2013.01); *H04W 4/023* (2013.01); *H04W 4/33* (2018.02); *H04W 4/80* (2018.02); *H04W 64/003* (2013.01)

(58) Field of Classification Search
CPC ... H04W 4/029; H04W 4/023; H04W 64/003; H04W 4/80; H04W 4/33; G01S 5/14; G01S 5/0252

USPC ....................................................... 455/456.1
See application file for complete search history.

(56) References Cited

U.S. PATENT DOCUMENTS

2018/0007530 A1* 1/2018 Tanaka .................... H04L 67/18

* cited by examiner

*Primary Examiner* — Inder P Mehra
(74) *Attorney, Agent, or Firm* — Kaplan Breyer Schwarz, LLP

(57) ABSTRACT

A system and methods for estimating the location of a mobile device are disclosed. In accordance with one embodiment, a mobile device receives an ultrasound signal lacking an identification of the source of the ultrasound signal. One or both of the mobile device or a server identify which of a plurality of beacons transmitted the ultrasound signal based on the time at which the mobile device received the ultrasound signal and the time at which the mobile device received a wireless electromagnetic signal prior to receiving the ultrasound signal. One or both of the mobile device or the server estimate a location of the mobile device based on the identified beacon and on the times at which the mobile device received the wireless electromagnetic and ultrasound signals.

8 Claims, 6 Drawing Sheets

WIRELESS LOCATION SYSTEM

FIELD OF THE INVENTION

Aspects and implementations of the present disclosure relate to wireless location systems, and more specifically, to estimating the location of mobile devices inside a building.

BACKGROUND

Wireless location systems have become popular in recent years. The Global Positioning System (GPS), for example, is a global navigation satellite system (GNSS) capable of providing geolocation and time information to GPS receivers, which have become ubiquitous in smartphones and vehicle navigation systems. GPS can provide geolocation and time information anywhere on or near the Earth where there is an unobstructed line of sight to four or more GPS satellites. However, obstacles such as mountains and buildings can compromise the accuracy of GPS signals and/or block them entirely. Consequently, GPS can be ineffective for locating mobile devices inside of buildings.

BRIEF DESCRIPTION OF THE DRAWINGS

Aspects and embodiments of the present disclosure may be better understood from the following detailed description with reference to the accompanying drawings.

DETAILED DESCRIPTION

Figure 1:
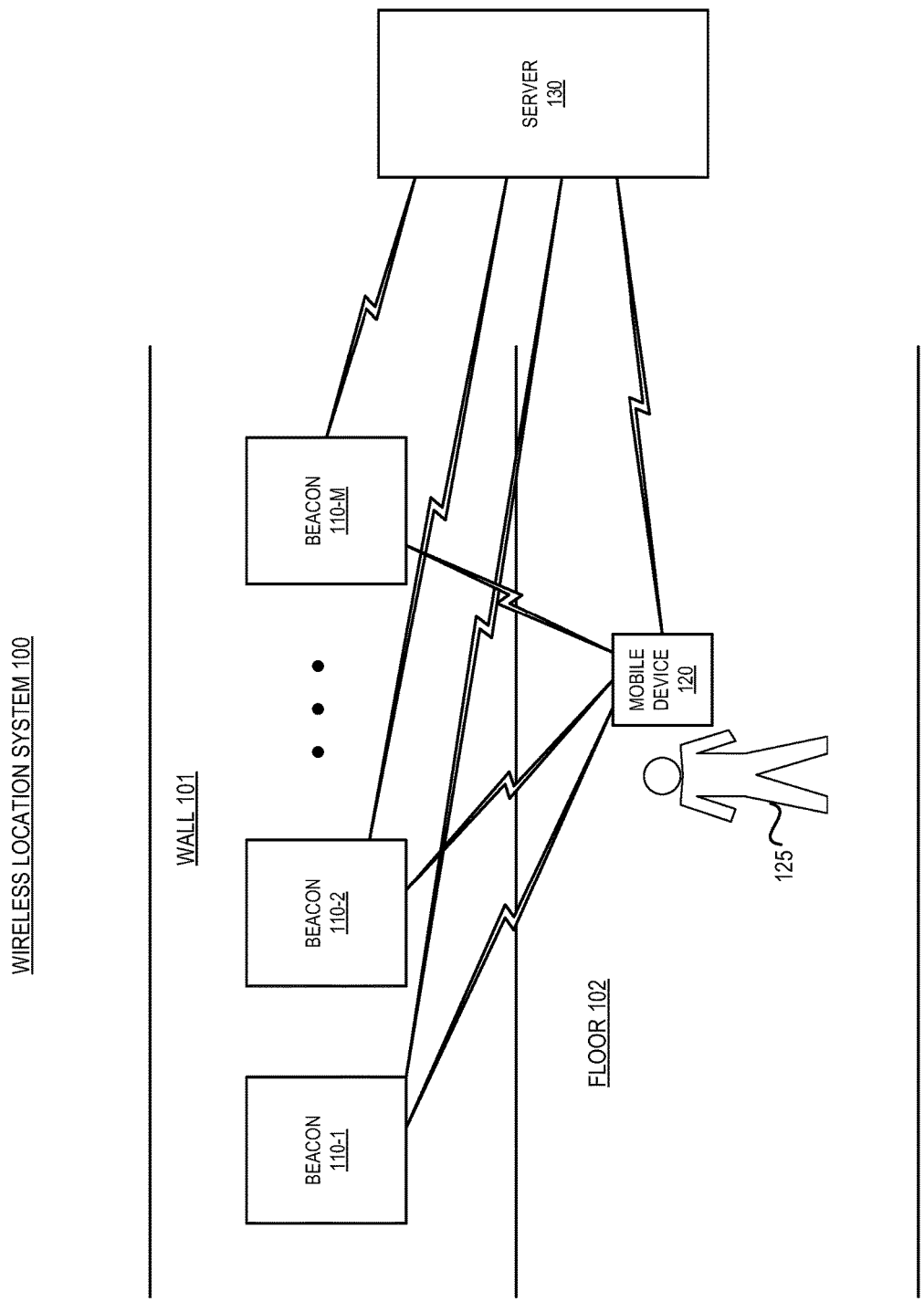
FIG. 1 depicts an illustrative system architecture, in accordance with one embodiment of the present disclosure.

A system and methods for estimating the location of a mobile device are disclosed. In accordance with one embodiment, the system comprises a plurality of beacons, each transmitting a respective wireless electromagnetic signal and a respective ultrasound signal. In one example, the system comprises a first beacon, a second beacon, and a third beacon. The first beacon transmits, during a first occurrence of a first time slot, a first wireless electromagnetic signal comprising a first identifier that identifies the first beacon as the source of the first wireless electromagnetic signal. The first beacon further transmits, during this first occurrence of the first time slot, a first ultrasound signal that lacks an identification of the source of the ultrasound signal. The first wireless electromagnetic signal and the first ultrasound signal are received by a mobile device during the first occurrence of the first time slot, with the first ultrasound signal being received after the first wireless electromagnetic signal.

The second beacon transmits, during a first occurrence of a second time slot, a second wireless electromagnetic signal comprising a second identifier that identifies the second beacon as the source of the second wireless electromagnetic signal, and transmits, during the first occurrence of the second time slot, a second ultrasound signal that lacks an identification of the source of the second ultrasound signal, where the first and second ultrasound signals have overlapping areas of coverage. The second wireless electromagnetic signal and the second ultrasound signal are received by a mobile device during the first occurrence of the second time slot, with the second ultrasound signal being received after the second wireless electromagnetic signal. The second time slot may be contiguous in time with the first time slot, or there may be one or more other time slots separating the first time slot and second time slot temporally.

The third beacon transmits, during the first occurrence of the first time slot, a third wireless electromagnetic signal comprising a third identifier that identifies the third beacon as the source of the third wireless electromagnetic signal, and transmits, during the first occurrence of the first time slot, a third ultrasound signal that lacks an identification of the source of the third ultrasound signal, where the first ultrasound signal and the third ultrasound signal have non-overlapping areas of coverage.

The first wireless electromagnetic signal, the first ultrasound signal, the second wireless electromagnetic signal, and the second ultrasound signal are used to estimate a location of the mobile device. The third wireless electromagnetic signal and the third ultrasound signal, which are not received by the mobile device, are not used to estimate the mobile device's location.

In accordance with one embodiment, one or both of the mobile device or a server identify which of the plurality of beacons transmitted the first ultrasound signal and which of the plurality of beacons transmitted the second ultrasound signal. As described above, in one implementation each wireless electromagnetic signal comprises an identifier that identifies which beacon transmitted the wireless electromagnetic signal, and thus the signal itself identifies the transmitting beacon. The ultrasound signals, however, do not comprise an identification of which beacon transmitted the ultrasound signal.

In one implementation the estimation of the location of the mobile device is based on the time that the first wireless electromagnetic signal is received by the mobile device, the time that the first ultrasound signal is received by the mobile device, the first identifier, the time that the second wireless electromagnetic signal is received by the mobile device, the time that the second ultrasound signal is received by the mobile device, the second identifier, and a maximum time-difference-of-arrival (TDOA) between electromagnetic and ultrasound signals received by the mobile device during an occurrence of a time slot. More particularly, as described in detail below, in one such implementation, the maximum TDOA is based on at least one of (1) a distance between two adjacent beacons in the set of beacons, or (2) the transmitted power of one or more ultrasound signals transmitted by one or more of the beacons.

In one example, the time-difference-of-arrival (TDOA) at the mobile device between a wireless electromagnetic signal and a subsequent ultrasound signal is used identify the source of the ultrasound signal. In particular, the TDOA is compared to the maximum TDOA, and if the TDOA is less than or equal to the maximum, then the beacon that transmitted the wireless electromagnetic signal is identified as the source of the ultrasound signal. In other words, when the times at which the electromagnetic and ultrasound signals are received are "close," then it is inferred that the two signals were transmitted by the same beacon. As described below, this inference is a result of the time-slotted coordination of the beacons.

Alternatively, when the TDOA of a pair of signals exceeds the maximum, the pair of signals is discarded (i.e., these signals are not used in the estimation of the location of the mobile device). The rationale for this is that it cannot be deduced that the beacon that transmitted the wireless electromagnetic signal also transmitted the ultrasound signal. In fact, it is just the opposite: in the absence of some type of error or bug, it can be deduced that the ultrasound signal was transmitted by a different beacon than the beacon that transmitted the wireless electromagnetic signal (or in theory, was transmitted by some other entity [e.g., a dog whistle, a stereo system having speakers with a tweeter that extends above 20 kHz, etc.]).

When it has been determined, based on the TDOA between a pair of electromagnetic and ultrasound signals, that the two signals were transmitted by the same beacon (and in particular, the beacon identified by the identifier embedded in the wireless electromagnetic signal), then the TDOA can be used to compute the distance between the mobile device and the beacon, as the location of the beacon (which is fixed) is known a priori. Thus, the TDOA is used both to identify the source beacon, and to compute the distance between the mobile device and the beacon. Further, when distances from the mobile device to two different beacons have been obtained (i.e., the distance between the mobile device and a first beacon that transmits a first pair of signals, and the distance between the mobile device and a second beacon that transmits a second pair of signals) the location of the mobile device can be estimated (e.g., via triangulation, etc.).

In some implementations where the server performs the estimation of the location of the mobile device, or participates in the estimation, the mobile device transmits to the server information concerning the mobile device's reception of electromagnetic and ultrasound signals. In one example, this information includes the times at which pairs of electromagnetic and ultrasound signals are received by the mobile device, and an identification of the beacon that transmitted the pair.

In one implementation, the wireless electromagnetic signals are Bluetooth Low Energy (BLE) signals. It some other implementations, however, the wireless electromagnetic signals may be transmitted in accordance with some other combination of frequency/power/protocol. For brevity, the term "BLE signal" will henceforth be used in lieu of "wireless electromagnetic signal," despite the fact that the wireless electromagnetic signal may be some other type of signal (e.g., "plain vanilla" Bluetooth, Zigbee, ZWave, etc.).

In one embodiment, beacons repeatedly transmit BLE and ultrasound signals in accordance with a period of T units of time, where the period is divided into a plurality of time slots, and where each beacon transmits the BLE and ultrasound signals at successive occurrences of the time slots. In one such embodiment, the beacons are organized into groups, such that one beacon from each group transmits during each occurrence of the first time slot, another beacon from each group transmits during each occurrence of the second time slot, and so forth. As described in detail below, parameters of the location system are established so that at any given occurrence of any time slot, the mobile device, regardless of its location, will receive signals from only one beacon. In other words, during an occurrence of the first time slot, in which one beacon from each group is transmitting, the mobile device will receive a pair of BLE and ultrasound signals from at most one beacon, thereby enabling the unambiguous identification of this beacon, which in turn enables computation of the distance between this beacon and the mobile device, which in turn enables estimation of the mobile device's location.

In some implementations, the order in which beacons transmit might be fixed for all periods, while in some other implementations, the order in which beacons transmit might vary for different periods. For example, in a system where beacons or organized into groups of three, the beacons of each group might always transmit in order 1-2-3 (i.e., the first beacon in each group transmits during the first time slot, the second beacon in each group transmits during the second time slot, and the third beacon in each group transmits during the third time slot. In some other examples, however, the order might change among periods (e.g., in one period the order might be 1-2-3, while in another period the order might be 2-3-1, etc.).

In one embodiment, adjustments may be made to the timing of beacons' transmissions to further reduce the chance of collisions. More particularly, rather than beacons always transmitting exactly at the beginning of their associated time slots, one or more beacon transmissions may be slightly delayed or transmitted ahead of their periodic schedule. For example, if time slots are 100 ms, then two beacons transmitting during the same time slot might not transmit exactly at the same time (namely, at the beginning of the time slot). Rather, one beacon might transmit at the exact beginning of the time slot (i.e., at time zero), while the other beacon might transmit a little later or earlier in the time slot (e.g., 5 ms into the time slot), thereby reducing the chance that the two beacons' transmissions completely collide.

In addition, in some implementations there might be a delay between a beacon's transmission of the BLE signal and its transmission of the ultrasound signal, rather than being transmitted at the same time. As long as the delay is not so large that the mobile device's receiving of the ultrasound signal "spills over" into the next time slot, and as long as this delay is known by the mobile device and/or the server, the distance between the mobile device and the beacon in question can be computed correctly. In such implementations, the maximum TDOA is increased to account for this delay.

In one embodiment, the beacons line a corridor of a building, and the location system estimates the location of a mobile device inside the corridor, typically carried by a person. In one such embodiment, adjacent beacons are organized into the groups described above, with each group consisting of a sequence of adjacent beacons. As disclosed above, in some implementations, two beacons in a group that are adjacent will transmit during contiguous time slots (e.g., the first of two adjacent beacons might transmit during, say, the third time slot, while the other beacon transmits during the fourth time slot), while in some other embodiments, two adjacent beacons might not necessarily transmit one immediately after the other (e.g., the first time slot and the fourth time slot, which are non-contiguous).

In some embodiments, the beacons lining the corridor are all located on the same wall (i.e., one of the two long walls of the corridor), while in some other embodiments, the beacons might be located on both long walls (for example, but not necessarily, alternating between the walls in an interleaved fashion). In some examples, the corridor may be one of a plurality of corridors inside a building. In some such examples, the building might be a single-floor building with two or more corridors, while in some other examples, the building might be a multi-floor building in which a given floor has two or more corridors, or in which a plurality of floors have one or more corridors, or both. In such multi-corridor buildings, a mobile device might receive signals from one or more beacons located in a different corridor than the corridor in which the mobile device is located (e.g., another corridor on the same floor as the mobile device, a corridor on the floor above the mobile device, a corridor on the floor below the mobile device, etc.). Because ultrasound signals typically do not penetrate walls/ceilings/floors, while BLE signals (and in general, wireless electromagnetic signals) are capable of doing so, a mobile device in a multi-corridor building might receive, during a particular occurrence of a given time slot, a plurality of BLE signals from beacons in different corridors. In such situations, the mobile device and/or the server distinguishes between the beacons by selecting the BLE signal with the highest received signal strength indication (RSSI) and identifying the corresponding beacon as the source of the ultrasound signal as well as the selected highest-RSSI BLE signal.

FIG. 1 depicts an illustrative system architecture 100, in accordance with one embodiment of the present disclosure. The system architecture 100 includes a plurality of beacons 110-1 through 110-M mounted on a wall 101 of a corridor inside a building, a mobile device 120 held by a user 125 standing on floor 102, and a server machine 130. In accordance with one implementation, each beacon 110 is capable of transmitting both BLE signals and ultrasonic signals, and the transmissions among beacons 110 are coordinated. An illustrative architecture for a beacon 110 is described in detail below with respect to FIG. 2, and the coordinated operation among the plurality of beacons 110 is described below and with respect to FIG. 5.

Mobile device 120 may be a cell phone, a smartphone, a tablet, a laptop computer, or any other type of computing or communication device. In accordance with one embodiment, mobile device 120 is capable of receiving BLE signals and ultrasonic signals, and of determining the times at which each of the signals is received. In some implementations, mobile device 120 is capable of estimating its location based on the received signals, while in some other implementations, mobile device 120 transmits the times at which signals are received to server machine 130. In one embodiment, mobile device 120 transmits information to server machine 130 wirelessly in accordance with an IEEE 802.11 protocol such as Wi-Fi or using a cellular connection. Details of mobile device 120 and its operation are described below with respect to FIGS. 3 and 6. It should be noted that, for convenience, a single mobile device 120 is depicted in FIG. 1; however, in some embodiments there may be a plurality of mobile devices in system 100, each operating in accordance with the method of FIG. 6 below.

Server machine 130 may be a rackmount server, a router computer, a desktop computer, a laptop, a tablet, a smartphone, etc., a cloud server, or any combination of the above. In accordance with one implementation, server machine 130 is capable of receiving information from mobile device 120 (e.g., via Wi-Fi), of estimating a location of mobile device 120 based on the received information, of transmitting information to beacons 110, and of receiving information from beacons 110. Details of server machine 130 and its operation are described below with respect to FIGS. 4 and 6.

It should be noted that in some embodiments in which system 100 comprises a plurality of mobile devices 120, server 130 is capable of receiving information from the plurality of mobile devices and estimating their location concurrently. In some implementations, the location may also be estimated by the mobile device. It should be further noted that although a single server machine 130 is depicted in FIG. 1, in some implementations there may be a plurality of such machines (e.g., to improve performance, fault-tolerance, etc.).

Figure 2:
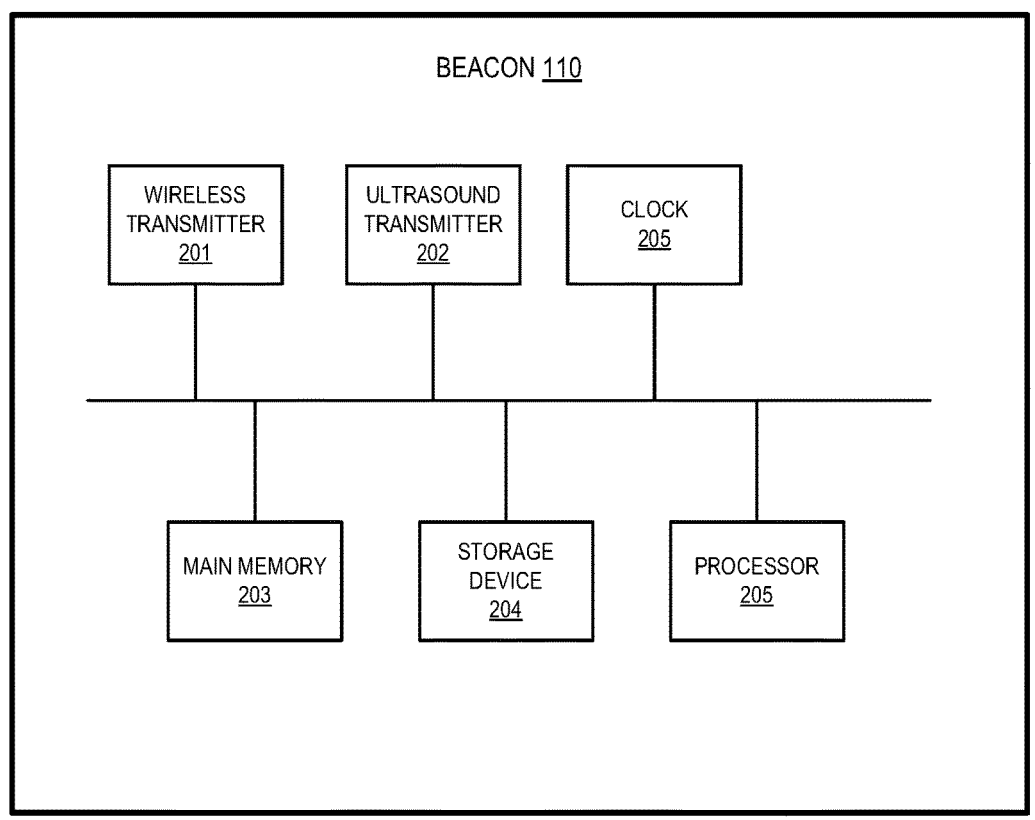
FIG. 2 depicts a block diagram of a beacon 110, as shown in FIG. 1, in accordance with one embodiment of the present disclosure.

FIG. 2 depicts a block diagram of a beacon 110 in accordance with one embodiment of the present disclosure. As shown in FIG. 2, beacon 110 comprises wireless transmitter 201, ultrasound transmitter 202, main memory 203, storage device 204, processor 205, clock 206, and wireless transceiver 207. Wireless transmitter 201 transmits wireless electromagnetic signals in accordance with the Bluetooth Special Interest Group's BLE wireless personal area network (PAN) technology standard. In some embodiments, wireless transmitter 201 might be part of a BLE radio that is capable of receiving BLE signals in addition to transmitting BLE signals. As disclosed above, in some other embodiments of the present disclosure wireless transmitter 201 might transmit a type of wireless electromagnetic signal that is different than BLE (e.g., "plain vanilla" Bluetooth, Zigbee, ZWave, etc.). In addition, in some embodiments the wireless signal may include an identifier that identifies beacon 110 as the source of the signal.

Ultrasound transmitter 202 is capable of transmitting ultrasonic signals (i.e., sound waves having a frequency above the range of human hearing, e.g. above 20 kHz). Main memory 203 is capable of storing executable instructions and data, and may include volatile memory devices (e.g., random access memory [RAM]), non-volatile memory devices (e.g., flash memory), and/or other types of memory devices. In accordance with one embodiment, main memory 203 stores information pertaining to a transmission schedule for the beacon. In one implementation, this information may include a re-transmission (or "update") period, an indication of the time slot during which the beacon transmits BLE and ultrasound signals (e.g., an index of the time slot, a time offset with respect to the period, etc.), an optional delay between transmission of the BLE and ultrasound signals, and an optional offset for adjusting the time at which signals are transmitted (for example, transmitting 5 milliseconds after the beginning of a time slot, rather than at the beginning of the time slot). In addition, main memory 203 may store the identifier that identifies the beacon and is embedded in the transmitted BLE signals, and/or instructions for processor 205 to execute. In one implementation, the information pertaining to the transmission schedule may be received from server 130. In addition, the identifier and/or processor instructions may be received from server 130 as well.

Figure 3:
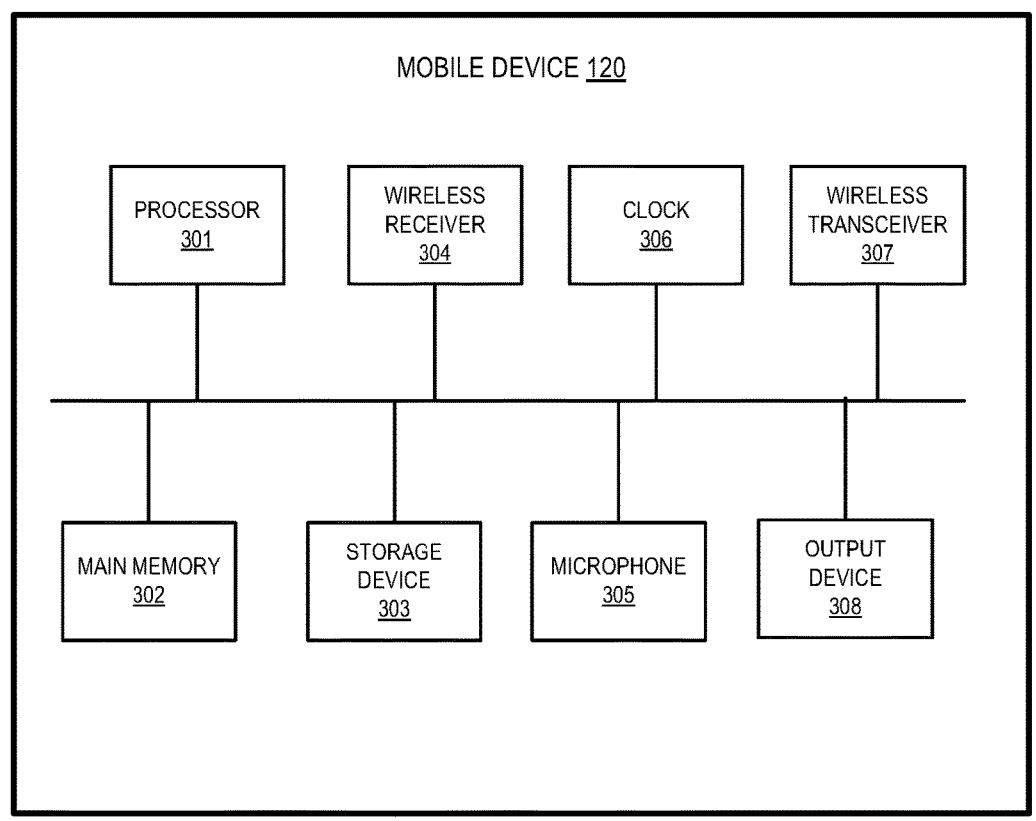
FIG. 3 depicts a block diagram of mobile device 120, as shown in FIG. 1, in accordance with one embodiment of the present disclosure.

Storage device 204 is capable of persistent storage executable instructions and data, and may include a magnetic hard disk, a Universal Serial Bus [USB] solid state drive, a Redundant Array of Independent Disks [RAID] system, a network attached storage [NAS] array, etc. In accordance with some implementations, storage device 303 may, like main memory 302, store the locations of beacons 110 and/or a location history of mobile device 120. While a single storage device is depicted in FIG. 3 for simplicity, mobile device 120 might comprise a plurality of storage devices.

Processor 205 represents one or more general-purpose processing devices such as a microprocessor, central processing unit, or the like. More particularly, processor 205 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 205 may also be one or more special-purpose processing devices such as an application specific integrated circuit (ASIC), a field programmable gate array (FPGA), a digital signal processor (DSP), network processor, or the like.

In accordance with one embodiment, processor 205 controls the transmissions of wireless transmitter 201 and ultrasound transmitter 202 based on the transmission schedule stored in memory 203 and/or storage device 204 and on time-related information received from clock 206. As described above, the transmissions by the plurality of beacons 110 are coordinated; this coordination is elaborated upon below with respect to FIG. 5. It should be noted that while a single processor is depicted in FIG. 2 for simplicity, in some embodiments beacon 110 might comprise a plurality of processors.

Clock 206 transmits the current time to processor 101. Wireless transceiver 207 is capable of receiving signals from and transmitting signals to server machine 130. In one embodiment, wireless transceiver 207 is a Wi-Fi radio. In one implementation, wireless transceiver 207 receives transmission schedule information from server machine 130, as described below with respect to FIG. 5, and may also transmit information to server machine 130 (e.g., status information, error codes, etc.).

FIG. 3 depicts a block diagram of mobile device 120 in accordance with one embodiment of the present disclosure. As shown in FIG. 3, mobile device 120 comprises processor 301, main memory 302, storage device 303, wireless receiver 304, microphone 305, clock 306, wireless transceiver 307, and output device 308.

Processor 301 represents one or more general-purpose processing devices such as a microprocessor, central processing unit, or the like. More particularly, processor 301 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 301 may also be one or more special-purpose processing devices such as an application specific integrated circuit (ASIC), a field programmable gate array (FPGA), a digital signal processor (DSP), network processor, or the like. Processor 301 is capable of executing instructions stored in main memory 302 and storage device 303, including instructions corresponding to the method of FIG. 6, described below; of reading data from and writing data into main memory 302 and storage device 303; of receiving information from wireless receiver 304 and microphone 305; of receiving time-related information from clock 306; of transferring information to and from wireless transceiver 307; and of transmitting signals to output device 308. It should be noted that while a single processor is depicted in FIG. 3 for simplicity, in some embodiments mobile device 120 might comprise a plurality of processors.

Main memory 302 is capable of storing executable instructions and data, and may include volatile memory devices (e.g., random access memory [RAM]), non-volatile memory devices (e.g., flash memory), and/or other types of memory devices. In accordance with some implementations, main memory 302 may store the locations of beacons 110, and may store a location history of mobile device 120.

Storage device 303 is capable of persistent storage executable instructions and data, and may include a magnetic hard disk, a Universal Serial Bus [USB] solid state drive, a Redundant Array of Independent Disks [RAID] system, a network attached storage [NAS] array, etc. In accordance with some implementations, storage device 303 may, like main memory 302, store the locations of beacons 110 and/or a location history of mobile device 120. While a single storage device is depicted in FIG. 3 for simplicity, mobile device 120 might comprise a plurality of storage devices.

Wireless receiver 304 is capable of receiving wireless electromagnetic signals (e.g., from beacons 110, etc.) and of forwarding the information encoded in these signals to processor 301. In one embodiment, wireless receiver 304 is capable of wirelessly receiving Bluetooth Low Energy (BLE) signals (e.g., from beacons 110, from one or more other BLE-enabled devices not depicted in the Figures, etc.).

Microphone 305 is capable of receiving ultrasonic signals (i.e., sound waves having a frequency above the range of human hearing), and of forwarding the information encoded in these signals to processor 301. In one embodiment, microphone 305 is capable of receiving signals within the range of human hearing (e.g., between 20 and 20 kHz, etc.) as well as ultrasonic signals. It should be noted that at the time of this writing, some smartphones and tablets have microphones whose range extends to 22 kHz, and may also include a display.

Clock 306 transmits the current time to processor 301. Wireless transceiver 307 is capable of receiving signals from and transmitting signals to server machine 130. In one embodiment, wireless transceiver 307 is a Wi-Fi radio. In one implementation, as described below with respect to FIG. 6, wireless transceiver 307 transmits to server machine 130 signals encoding information comprising time-of-arrival and/or time-difference-of-arrival (TDOA) data, and receives from server machine 130 information regarding mobile device's 120 location.

Output device 308 receives signals from processor 301, and emits corresponding output signals that can be sensed by the user. The output mechanism of output device 308 might be a light-emitting diode (LED) display, a speaker, etc. In one embodiment, output device 308 displays the current location of mobile device 120. It should be noted that in some embodiments, mobile device might comprise an input device in addition to output device 308, either as a separate device or as integrated I/O device such as a touchscreen. It should be further noted that while a single output device 308 is depicted in FIG. 3 for simplicity, mobile device 120 might comprise a plurality of output devices.

Figure 4:
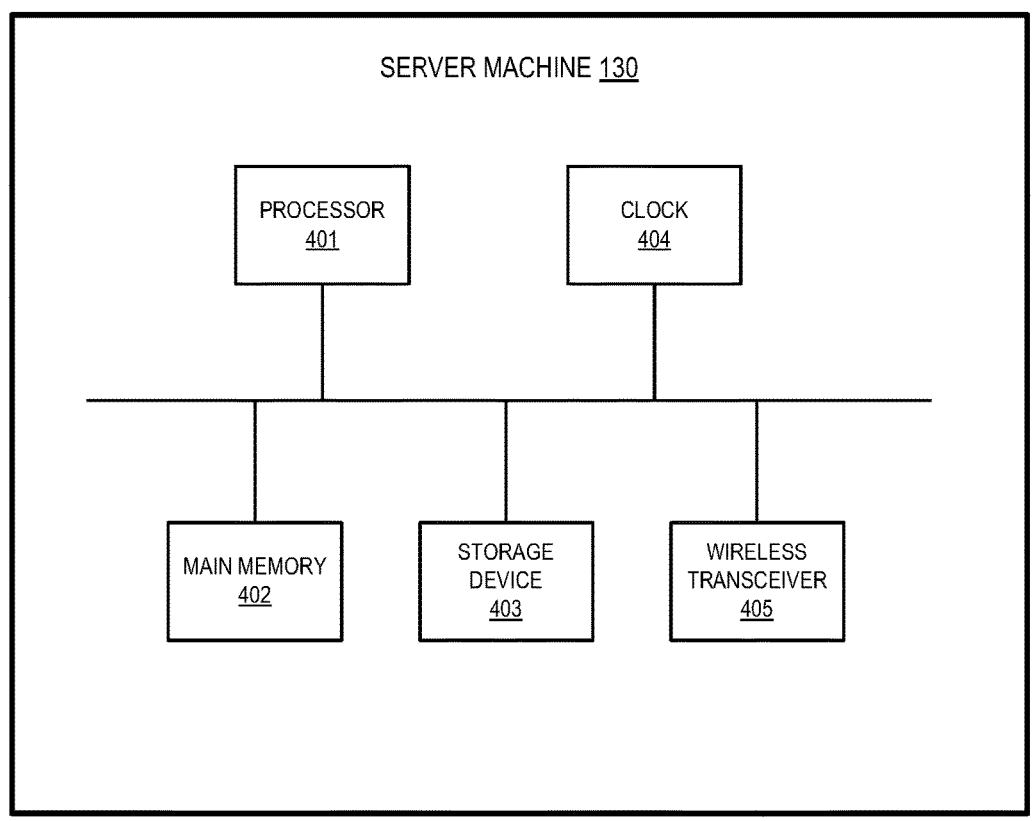
FIG. 4 depicts a block diagram of server machine 130, as shown in FIG. 1, in accordance with one embodiment of the present disclosure.

FIG. 4 depicts a block diagram of server machine 130, as shown in FIG. 1, in accordance with one embodiment of the present disclosure. As shown in FIG. 4, server machine 130 comprises processor 401, main memory 402, storage device 403, clock 404, and wireless transceiver 405.

Processor 401 represents one or more general-purpose processing devices such as a microprocessor, central processing unit, or the like. More particularly, processor 401 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 401 may also be one or more special-purpose processing devices such as an application specific integrated circuit (ASIC), a field programmable gate array (FPGA), a digital signal processor (DSP), network processor, or the like. Processor 401 is capable of executing instructions stored in main memory 402 and storage device 403, including instructions corresponding to the method of FIG. 6, described below; of reading data from and writing data into main memory 402 and storage device 403; of receiving time-related information from clock 404; and of receiving information from and transferring information to and from wireless transceiver 405. It should be noted that while a single processor is depicted in FIG. 4 for simplicity, in some embodiments server machine 130 might comprise a plurality of processors.

Main memory 402 is capable of storing executable instructions and data, and may include volatile memory devices (e.g., random access memory [RAM]), non-volatile memory devices (e.g., flash memory), and/or other types of memory devices. In accordance with some implementations, main memory 402 may store one or more of the following: the locations of beacons 110, transmission schedule information for beacons 110, identifiers for beacons 110, processor instructions for beacons 110, a location history of mobile device(s) 120, time-of-arrival and/or time-difference-of-arrival information for mobile device(s) 120, computed distances between mobile device(s) 120 and beacons 110, and so forth.

Storage device 403 is capable of persistent storage executable instructions and data, and may include a magnetic hard disk, a Universal Serial Bus [USB] solid state drive, a Redundant Array of Independent Disks [RAID] system, a network attached storage [NAS] array, etc. In accordance with some implementations, storage device 403 may, like main memory 402, store one or more of the following: the locations of beacons 110, transmission schedule information for beacons 110, identifiers for beacons 110, processor instructions for beacons 110, a location history of mobile device(s) 120, time-of-arrival and/or time-difference-of-arrival information for mobile device(s) 120, computed distances between mobile device(s) 120 and beacons 110, and so forth. While a single storage device is depicted in FIG. 4 for simplicity, server machine 130 might comprise a plurality of storage devices.

Clock 404 transmits the current time to processor 401. Wireless transceiver 405 is capable of receiving signals from and transmitting signals to mobile device(s) 120. In one embodiment, wireless transceiver 405 is a Wi-Fi radio. In one implementation, as described below with respect to FIG. 6, wireless transceiver 405 receives from mobile device(s) 120 information comprising time-of-arrival and/or TDOA data, as well as an identifier of the beacon 110 that transmitted the pair of signals corresponding to the time-of-arrival/TDOA data. In some embodiments, wireless transceiver 405 may also transmit to each mobile device 120 information regarding the mobile device's location. In one embodiment, wireless transceiver 405 is a Wi-Fi radio. In one implementation, wireless transceiver 405 transmits transmission schedule information to beacons 110, as described below with respect to FIG. 5, and may also receive information from beacons 110 (e.g., status information, error codes, etc.).

Figure 5:
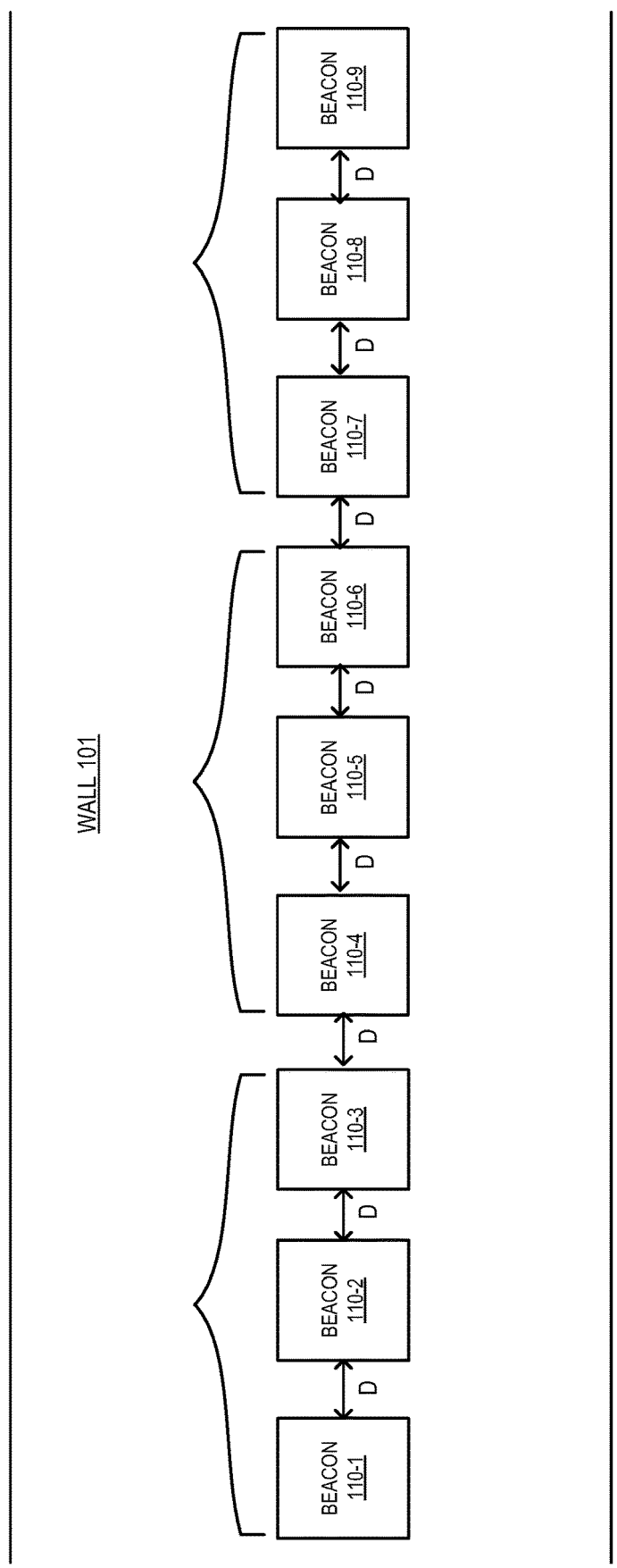
FIG. 5 depicts an illustrative grouping of beacons 110, as shown in FIG. 1, in accordance with one embodiment of the present disclosure.

FIG. 5 depicts an illustrative grouping of beacons 110 in accordance with one embodiment of the present disclosure. As described below, the arrangement is parameterized, and thus FIG. 5 actually represents a class of arrangements, where a particular instance of the class can be constructed by selecting particular values for a set of parameters of the system (i.e., by instantiating various variables corresponding to system parameters). When system parameter values are selected that are consistent with each other, and that satisfy a particular set of conditions, the beacons 110 will coordinate their transmission in a manner that ensures correct operation of system 100. The various system parameters are described in detail below.

As shown in FIG. 5, beacons 110 are arranged linearly along the wall of a corridor, spaced D units of distance apart, and are organized into groups of N beacons. For convenience, the beacons are organized into groups of three in FIG. 5 (N=3, and M=9 [M is the total number of beacons, as in FIG. 1]), rather than representing the groups as {110-1, 110-2, . . . 110-N}, {110-(N+1), 110-(N+2), 110-(2*N)}, . . . {110-((M−N)+1), 110-(*M−N)+2), 110-(M)}, which would be extremely unwieldy to depict in the figure.

Each beacon repeatedly transmits a pair of signals (i.e., a BLE signal and an ultrasound signal) in accordance with a period T. More particularly, period T is divided into N equally-sized time slots, such that, for any given group, the beacons in that group are assigned to time slots in one-to-one fashion. As a result, a mobile device proximate to a given group will receive, at any given time, a pair of signals from no more than one beacon in the group.

In accordance with one embodiment, the leftmost beacon in each group is assigned to the same time slot (or, a "common time slot"); the second-from-the-left beacon in each group is assigned to a common time slot that is different than that of the leftmost beacons; and so forth. Accordingly, when two beacons transmit during a common time slot (or, to be more precise, during a particular occurrence of that common time slot), the beacons are spaced at least N*D units of distance apart. When the set of system parameters, which includes N, D, and T, are instantiated in a consistent and correct manner, a mobile device will receive at most one pair of signals at any given time, regardless of its location. More particularly, the mobile device will always be proximate to a "window" of N beacons, where the window may cut across group boundaries, and the mobile device will receive a pair of signals from only one these beacons during any occurrence of any time slot. Moreover, the beacon will not receive a pair of signals from any beacon outside of the window.

In one implementation, the set of system parameters comprise: the period T; the number of beacons N in each group, which is also the number of time slots in period T; the spacing D between adjacent beacons; the maximum TDOA between the receiving of the BLE and ultrasound signals; and the power P with which the ultrasound signals are transmitted by the beacons. In order for system 100 to operate correctly, the values of these parameters are to be selected so that the following conditions are satisfied:

(1) during a given occurrence of a given time slot, the mobile device receives an ultrasound signal from at most one of the beacons assigned to that time slot (i.e., the mobile device cannot receive ultrasound signals from two beacon groups during the time slot occurrence);

(2) for a given pair of BLE and ultrasound signals transmitted by a given beacon during a given occurrence of a given time slot, both signals are received by the mobile device within that time slot occurrence (i.e., the delay between the transmitting and the receiving of the signals is less than the time slot length, which equals T/N);

(3) the distance between beacons transmitting during the same time slot must be large enough to ensure that the mobile device cannot receive ultrasound signals from more than one beacon during occurrences of the time slot;

(4) the maximum TDOA is less than the time slot length T/N; and (5) the maximum TDOA must be less than or equal to the time it takes an ultrasound signal to travel the maximum range of the signal, where the maximum range (i) is a function of the transmitted power P, and (ii) is less than or equal to N*D units of distance, because the distance between the mobile device and a beacon that the mobile device can "hear" must be less than or equal to N*D.

It should be noted that in some implementations, the number of beacons in each group might not be required to be equal to the number of time slots. In such implementations, an additional inequality might be added to the conditions above: namely, that the number of beacons must be less than or equal to the number of time slots.

In some examples, one or more of the system parameters may be fixed, thereby constraining the selection of values for other system parameters. For example, if the beacons have already been deployed, in which case the spacing D is already determined, then enforcing condition (1) will depend on the selection of other system parameter values such as the ultrasound transmission power and the time slot length.

As will be appreciated by those skilled in the art, a variety of existing techniques may be used to determine parameter values satisfying the above conditions. Such techniques include, for example, guided search, optimization methods (e.g., linear programming, etc.), constraint-satisfaction algorithms, empirical trial-and-error, trial-and-error based on manual computations, and so forth. It should be further noted that in some examples, the inter-beacon spacing might not be uniform, and/or the transmitted power of beacons might not be uniform, and/or the number of beacons in each group might not be uniform, etc., and it will be clear to those skilled in the art how to modify the above system parameter conditions accordingly.

Figure 6:
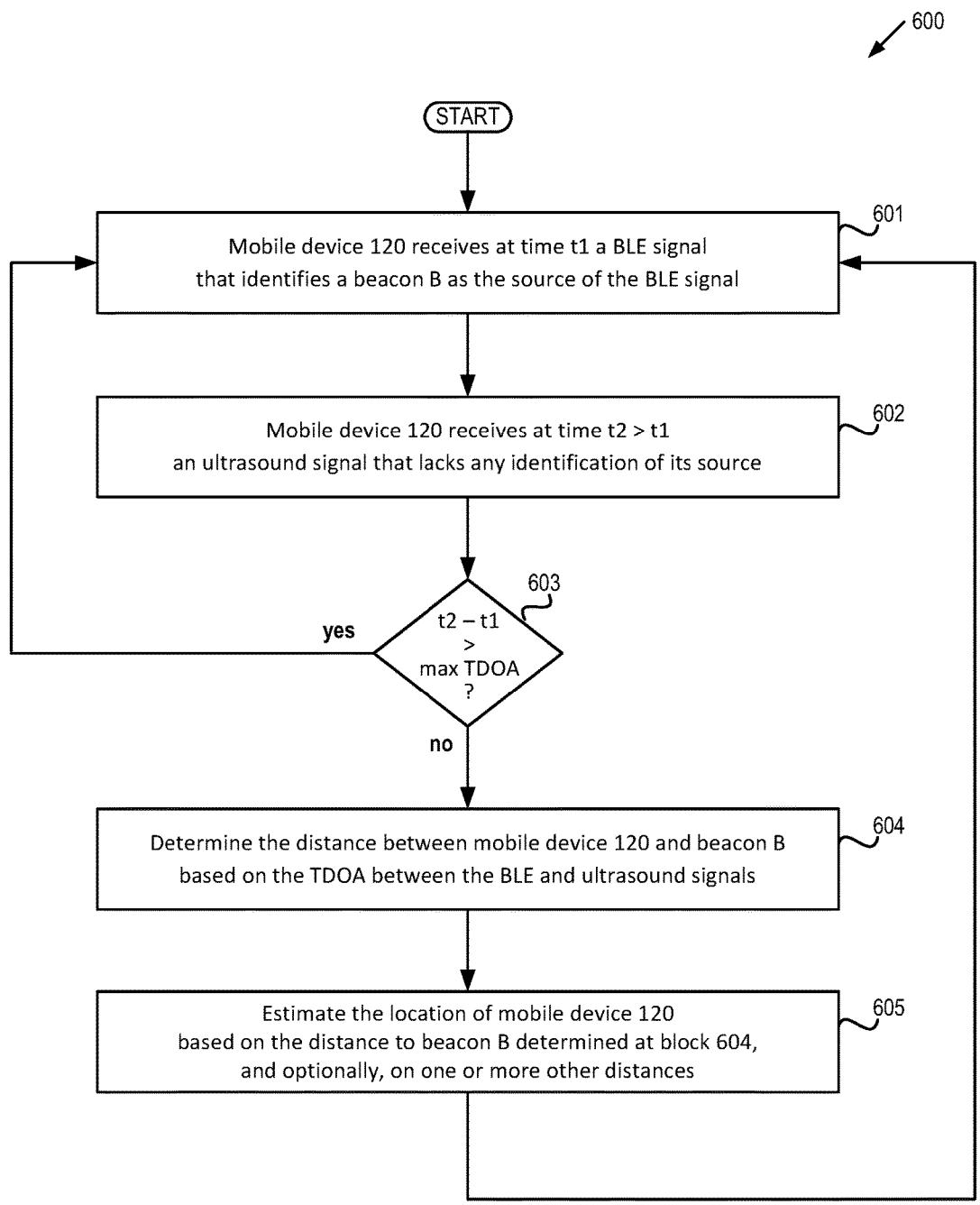
FIG. 6 depicts a flow diagram of aspects of a method for estimating a location of mobile device 120, as shown in FIG. 1, in accordance with one embodiment of the present disclosure.

FIG. 6 depicts a flow diagram of aspects of a method 600 for estimating a location of a mobile device 120, as shown in FIG. 1, in accordance with one embodiment of the present disclosure. The method is performed by processing logic that may comprise hardware (circuitry, dedicated logic, etc.), software (such as is run on a general-purpose computer system or a dedicated machine), or a combination of both. In some embodiments, the method may be performed in its entirety by mobile device 120, while in some other embodiments, one or more blocks of the method may be performed by server machine 130. In some implementations, blocks depicted in FIG. 6 might be performed simultaneously or in a different order than that depicted.

At block 601, mobile device 120 receives at time t1 a BLE signal that identifies a particular beacon 110, call it beacon B, as the source of the BLE signal. In accordance with one implementation, if one or more additional BLE signals are received close in time to t1, then, it is inferred that the additional signal(s) are coming from beacon(s) on different floor(s) than the mobile device 120. When this occurs, the BLE signal with the strongest RSSI is selected, and the beacon that transmitted this strongest signal is designated as beacon B.

At block 602, mobile device 120 receives at time t2>t1 an ultrasound signal that lacks any identification of its source. At block 603, time difference t2−t1 is compared to a maximum time difference of arrival (TDOA). If t2−t1 is greater than the maximum TDOA, then it is inferred that the ultrasound signal was not transmitted by beacon B. Given that the two signals cannot be used to compute a distance to a common beacon (and are therefore unusable for estimating the location of mobile device 120), the signals are discarded, and execution continues back at block 601. If, on the other hand, t2−t1 is less than or equal to the maximum TDOA, then it is inferred that beacon B transmitted the ultrasound signal in addition to the BLE signal, and execution proceeds to block 604.

At block 604, the distance between the mobile device 120 and beacon B is determined based on the TDOA between the BLE and ultrasound signals. At block 605, the location of the mobile device 120 is estimated based on the distance to beacon B determined at block 604, and optionally, on one or more other distances (e.g., another distance to beacon B determined at a previous iteration of loop 601-605, distance(s) to one or more other beacons determined at previous iterations of loop 601-605, etc.).

As will be appreciated by those skilled in the art, the location estimation is most effective when a plurality of distances have been determined. Accordingly, in some implementations, block 605 might not be performed until a distance to another beacon has been determined in addition to the distance to beacon B. In such implementations, block 605 might not be performed during the first iteration of loop 601-605, and potentially might not be performed during one or more subsequent iterations, until a distance to a first beacon and a distance to a second beacon have been obtained. After block 605 has been performed, execution continues back at block 601. [63] As disclosed above, in some implementations method 600 may be performed in its entirety by mobile device 120. In some other implementations, one or more blocks of method 600 may be performed by server machine 130. In one example, mobile device 120 transmits the times-of-arrival t1 and t2 to server machine 130, possibly along with the identifier within the BLE signal that identifies beacon B. The server machine 130 may then perform blocks 603, 604, and 605 (e.g., comparing the time difference t2−t1 to the maximum TDOA; determining whether to use or discard the pair of signals; computing, when the pair of signals is to be used, the distance between the mobile device 120 and beacon B based on the TDOA; and estimating the location of mobile device 120 based on one or more computed distances). In another example, mobile device 120 may perform block 603 in addition to blocks 601 and 602, with server machine 130 performing blocks 604 and 605. In accordance with one or both of these examples, server machine 130 may transmit the estimated location to mobile device 120, or may instead keep the location information to itself and/or transmit it to some other entity without sharing it with mobile device 120. [64] It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising a plurality of beacons, the plurality of beacons comprising:
   a first beacon to:
      transmit, during a first occurrence of a first time slot, a first wireless electromagnetic signal comprising a first identifier that identifies the first beacon as the source of the first wireless electromagnetic signal, and
      transmit, during the first occurrence of the first time slot, a first ultrasound signal that lacks an identification of the source of the ultrasound signal;
   a second beacon to:
      transmit, during a first occurrence of a second time slot that is contiguous in time with the first occurrence of the first time slot, a second wireless electromagnetic signal comprising a second identifier that identifies the second beacon as the source of the second wireless electromagnetic signal, and
      transmit, during the first occurrence of the second time slot, a second ultrasound signal that lacks an identification of the source of the second ultrasound signal;
   wherein the first wireless electromagnetic signal and the first ultrasound signal are received by a mobile device during the first occurrence of the first time slot, the first ultrasound signal received after the first wireless electromagnetic signal; and
   wherein the second wireless electromagnetic signal and the second ultrasound signal are received by the mobile device during the first occurrence of the second time slot, the second ultrasound signal received after the second wireless electromagnetic signal; and
   wherein the first ultrasound signal and the second ultrasound signal have overlapping areas of coverage; and
   wherein the first wireless electromagnetic signal, the first ultrasound signal, the second wireless electromagnetic signal, and the second ultrasound signal are used to estimate a location of the mobile device.

2. The apparatus of claim 1 wherein at least one of the first wireless electromagnetic signal or the second wireless electromagnetic signal is a Bluetooth Low Energy (BLE) signal.

3. The apparatus of claim 1 further comprising:
   a third beacon to:
      transmit, during the first occurrence of the first time slot, a third wireless electromagnetic signal comprising a third identifier that identifies the third beacon as the source of the third wireless electromagnetic signal, and
      transmit, during the first occurrence of the first time slot, a third ultrasound signal that lacks an identification of the source of the third ultrasound signal;
   wherein the first ultrasound signal and the third ultrasound signal have non-overlapping areas of coverage.

4. The apparatus of claim 3 wherein the mobile device does not receive the third ultrasound signal during the first occurrence of the first time slot.

5. The apparatus of claim 3 wherein the first beacon, the second beacon and the third beacon are also to repeatedly transmit electromagnetic and ultrasound signals in accordance with a period of T units of time, and wherein the period is divided into a plurality of time slots comprising the first time slot and the second time slot, and wherein the first beacon transmits during the first time slot of each period, and wherein the second beacon transmits during the second time slot of each period, and wherein the third beacon transmits during the first time slot of each period.

6. The apparatus of claim 3 wherein the first beacon, the second beacon, and the third beacon belong to a set of beacons that line a corridor of a building, and wherein the first beacon and the third beacon are non-adjacent, and wherein estimating the location of the mobile device is based on:
   the time that the first wireless electromagnetic signal is received by the mobile device,
   the time that the first ultrasound signal is received by the mobile device,
   the first identifier,
   the time that the second wireless electromagnetic signal is received by the mobile device,
   the time that the second ultrasound signal is received by the mobile device,
   the second identifier, and
   a maximum time difference of arrival between electromagnetic and ultrasound signals received by the mobile device during an occurrence of a time slot, wherein the maximum time difference of arrival is based on at least one of (1) a distance between two adjacent beacons in the set of beacons, or (2) the transmitted power of one or more ultrasound signals.

7. The apparatus of claim 6 wherein the first beacon and the second beacon are adjacent, and wherein the first time slot and the second time slot are non-contiguous in time.

8. The apparatus of claim 1 wherein the mobile device transmits, to a server, information comprising the time that the first wireless electromagnetic signal is received by the mobile device, the time that the first ultrasound signal is received by the mobile device, the time that the second wireless electromagnetic signal is received by the mobile device, and the time that the second ultrasound signal is received by the mobile device, and wherein the server estimates the location of the mobile device based on the information.

* * * * *